Sept. 1, 1925.
R. G. SANDS
1,551,701
ELECTRICAL PROTECTIVE APPARATUS
Filed May 28, 1923
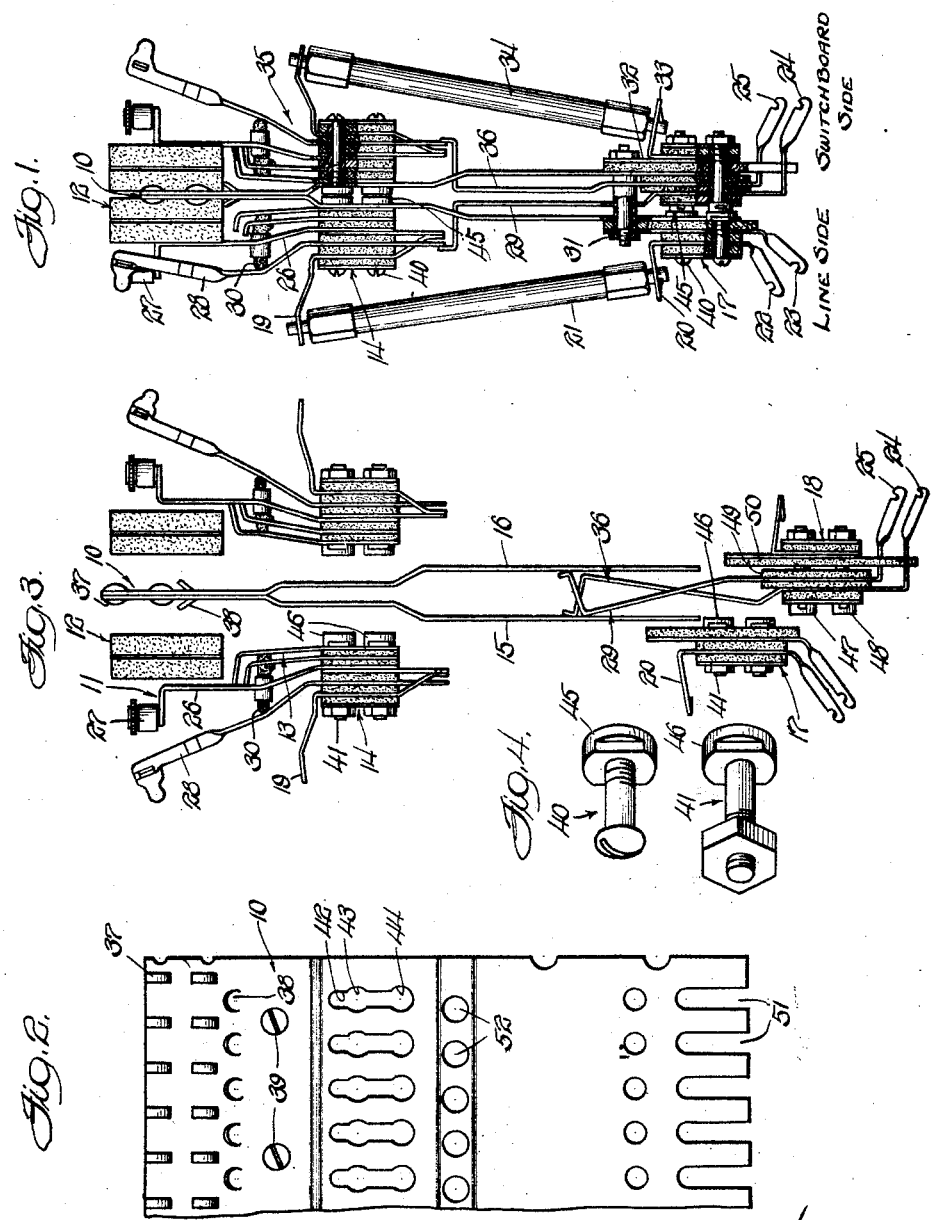
Inventor:
Roy Granville Sands Patented Sept. 1, 1925.

1,551,701

UNITED STATES PATENT OFFICE.

ROY G. SANDS, OF WAUKEGAN, ILLINOIS, ASSIGNOR TO COOK ELECTRIC COMPANY, OF CHICAGO, ILLINOIS, A CORPORATION OF ILLINOIS.

ELECTRICAL PROTECTIVE APPARATUS.

Application filed May 28, 1923. Serial No. 641,985.

*To all whom it may concern:*

Be it known that I, ROY G. SANDS, a citizen of the United States, residing at Waukegan, in the county of Lake and State of Illinois, have invented new and useful Improvements in Electrical Protective Apparatus, of which the following is a full, clear, concise, and exact description, reference being had to the accompanying drawing, forming a part of this specification.

The subject matter of this invention has reference to electrical protective apparatus which may comprise devices for protection against excessive currents or excessive voltages and may be used for the protection of telephone, telegraph or other electrical circuits.

More particularly, my invention relates to devices comprising fuses, lightning arresters and heat coils, or any one of them, so arranged in combination that the device in its entirety may be mounted upon a panel, such a panel accommodating as many of said devices as may be desired.

The structure comprising this invention is in part an improvement on the invention shown and described in the copending application of George R. Folds, entitled "Protective devices," Serial No. 367,192, filed March 19, 1920.

It is desirable to protect telephone and telegraph circuits against both high potentials and abnormal currents and for this purpose the incoming lines at stations may each be wired through fuses to a lightning arrester comprising a short spark gap with one electrode grounded for protection against excessive potentials and also to what is known as a heat coil for protection against excessive currents. Such fuses, lightning arresters and heat coils may conveniently be combined into structures that are readily adapted to be mounted in groups upon a mounting plate or panel, which serves the double purpose of forming a mounting plate or ground bar connection.

One of the objects of this invention resides in the production of an improved combination fuse, lightning arrester and heat coil construction adapted to be conveniently attached and detached from a mounting panel.

A further aim of this invention consists in the provision of structures of the character above indicated which may be mounted upon either or both sides of a panel member, comprising spaced walls, the structures each being removable from the panel member independently and in assembled condition and also while the spaced walls of the panel member remain interconnected.

Another object consists in the provision of an improved design for a device of the character above indicated which will simplify and reduce the cost of the construction and which will materially reduce the work required to assemble and maintain the protective equipment of telephone exchanges and telegraph stations.

Other objects of the invention will become apparent from the following description and the appended claims.

One embodiment of the invention is illustrated in the accompanying drawings, in which—

Figure 1 is an elevational view partly in section, illustrating an assembled device embodying my invention;

Fig. 2 is an elevational side view of a mounting panel embodied in my invention, the panel being adapted for disposition on a telephone distributing frame;

Fig. 3 is an elevational view similar to Fig. 1, but showing various portions of the device in disassembled relationship; and, Fig. 4 illustrates in detailed perspective two alternative forms of bolting means adapted to be used for bolting the protective devices and terminals upon the panel member.

Many details comprising the structure as illustrated are fully shown and described in the copending application above referred to and such details accordingly will be here described only in so far as desirable for a full understanding of the present invention.

The device comprises in a general way a mounting panel member 10, also serving as a grounding plate upon which the protective devices and terminal assemblies may be removably mounted. A typical lightning arrester and heat coil unit may comprise a heat coil structure, as at 11, a lightning arrester as at 12 and grounding switch as at 13 and the necessary insulated connections and terminal members as at 14. Similar lightning arresters and heat coil assemblies may be mounted upon either side of the mounting panel 10.

The mounting panel 10 may comprise a pair of interconnected plates 15 and 16. The necessary insulated connections and terminal members for the line side of the device may be embodied in a "line terminal assembly" 17, while the corresponding insulated connections and terminal members for the switchboard side of the device may be embodied in a "switchboard terminal assembly" 18, mounted at the lower edge of the plate 16. The terminal members at 14 and the line terminal assembly 17 may include fuse clips 19 and 20, respectively, which cooperate in any usual and suitable manner to retain a fuse, as at 21.

In order to explain the functions of the various elements of the device, as shown in Fig. 1, the circuits will now be traced from a pair of typical entering line side terminals 22 and 23 and a corresponding pair of switchboard terminals 24 and 25. From the terminal 22, the current may pass through the fuse clip 20, fuse 21, the fuse clip 19 to a heat coil mounting spring 26, heat coil 27, heat coil operating spring 28, to a connecting bar 29 which comprises an extension of the switchboard terminal 24.

It will be understood that the heat coil 27 may be of any suitable known construction whereby the heat generated by excessive currents therethrough results in the release of the operating spring 28 to the position shown in Fig. 3, thereby opening the circuit at this point. The heat coil mounting spring 26 may also serve to slidably retain the carbon electrodes of the gap arrester 12 against the face of the mounting panel 10, as best indicated in Fig. 1.

The grounding switch 13 may serve to short circuit the lightning arrester 12 and directly ground the heat coil structure at such times as the heat coil operating spring 28 is in its open circuit position, indicated in Fig. 3. When the operating spring 28 is in the closed circuit position indicated in Fig. 1, it serves to hold the switch 13 in its open circuit position through the medium of the insulating pin 30.

From the other line terminal 23 current may flow to an insulated connecting pin 31 which extends through the panel member to the opposite side thereof where, through a connecting piece 32, contact is made with a fuse clip 33. From the fuse clip 33, current may flow through a fuse 34 and thence through a lightning arrester and heat coil structure at 35 similar to that just described on the opposite face of the mounting panel. A connecting bar 36 performs a function similar to the connecting bar 29 and comprises an extension of the switchboard terminal 25.

The mounting plates 15 and 16 may be formed in any suitable manner as by stamping from sheet metal and are each preferably provided with suitable struck-up portions as at 37 and 38 for slidably retaining the carbon electrodes of the lightning arrester in position. The lower portions of the mounting plates may be separated and divergent, thus forming a bifurcated lower edge or double-walled mounting panel. The plates 15 and 16 may be welded together, or if desired, may be interconnected by screws as at 39.

The various insulated connections and terminal assemblies above described, may be held together by pairs of screws or bolts, such as illustrated in Fig. 4 at 40 and 41. The upper diverging portions of the panel member 10 may be provided with a number of slots as at 42 equal to the number of protective units for which provision is to be made upon the mounting strip. The slots 42 may be provided with rounded portions 43 and 44 for receiving either the nuts as at 45 upon bolts 40, or bolt heads as at 46 upon bolts 41.

The various protective assemblies and terminal assemblies may be first loosely assembled upon the bolts. Then the nuts 45 or bolt heads 46 may be inserted in the slots. By sliding the assemblies upwardly and tightening the bolts, the assemblies may be rigidly fixed in place upon the panel members. In carrying out the above described process, the assemblies 14 and 35 may be first individually mounted in place. Then the line terminal assemblies and switchboard terminal assemblies may be attached in a manner hereinafter described.

The switchboard terminal assembly 18 may be assembled upon a pair of bolts 47 and 48 of any suitable form, sufficient space being retained between insulation pieces 49 and 50 to permit the plate 16 to be slid therebetween. The plates 15 and 16 both may be provided at the lower edges with open ended slots as shown at 51 in Fig. 2. In attaching the switchboard terminal assembly 18, the connecting bars 29 and 36 being flexible may be pressed together and then slid up between the plates 15 and 16, as indicated in Fig. 3. Meanwhile the slots as at 51 will become engaged by the bolts 47 and 48. When the connecting bars 29 and 36 reach their normal position, as shown in Fig. 1, they will extend out through openings as at 52 in the plates 15 and 16 and thereby make contact with the protective assembly members. The openings 52 should be of sufficient size to permit the connection bars to extend therethrough without danger of contacting with the plates 15 or 16.

After the switchboard terminal assembly has been thus mounted in position, the insulated connecting rod 31 may be inserted and the various parts comprising the line terminal assembly may be threaded upon bolts 40 or 41 which engage the slots at the lower edge of the plate 15. After the assemblies have been firmly clamped in place, the fuses 31 and 34 may be installed in place.

If at any time it should become necessary or desirable to inspect or replace any of the above described parts including the bolts 40 or 41, it will be possible to do so without disturbing adjacent assemblies upon the mounting panel and also while the plates 15 and 16 remain interconnected. The assemblies 14, 18 and 35 furthermore may be slid on and off from the mounting plate while still in assembled condition, in respect to the bolting means.

With the design embodying the present invention, a group of assemblies, such for instance as may be connected to the two line wires of a single circuit, may be largely assembled before being placed upon the mounting plates and since it is unnecessary to disassemble these units in order to mount them, the greater portion of the assembling operation may be efficiently and accurately performed as a part of the process of the manufacture of the device.

This invention is obviously not limited to the specific embodiments thereof herein illustrated and described, but it is to be understood that the invention is capable of other variations and many modifications within its spirit and scope as set forth in the following claims.

Having thus described my invention, what I claim as new and desire to secure by Letters Patent in the United States, is:

1. Protective apparatus comprising a mounting plate member, a series of unitary assemblies disposed along one side of said plate member and each comprising devices for protection against excessive voltages and excessive currents and bolts extending transversely of said plate member and each serving to retain one of said assemblies in assembled condition, said plate member being provided with means for removably receiving said bolts while the assemblies are retained thereon.

2. In a device of the character described, a mounting means consisting of two plates interconnected face to face, portions of said plates being separated and diverging, a plurality of unitary assemblies each comprising devices for protection against excessive voltages and excessive currents, and a plurality of means for retaining said assemblies along either of the outside surfaces of said separated plate portions, said means providing for complete and independent removal of each of said assemblies while still in assembled condition and while the plates remain interconnected.

3. Protective apparatus comprising a mounting plate member having a longitudinally bifurcated portion, a plurality of unitary assemblies each comprising a lightning arrester and a heat coil structure, said assemblies being oppositely disposed along the outside surfaces of said bifurcated plate portion, and means for retaining said assemblies upon said plate member and providing for complete and independent removal from said bifurcated portion of each of said assemblies while still in assembled condition.

4. Protective apparatus comprising a mounting plate member having a longitudinally bifurcated portion, a plurality of unitary assemblies each comprising a lightning arrester and a heat coil structure, said assemblies being oppositely disposed along the outside surfaces of said bifurcated plate portion, and bolting means forming a part of each of said assemblies, each part of said bifurcated portion being slotted to removably receive each of said bolting means whereby each of said assemblies may be completely and independently removed from the plate member while still in assembled condition.

5. In a device of the character described, a panel member comprising spaced walls, a plurality of switchboard terminal assemblies and protective apparatus assemblies mounted upon said member and each removable therefrom independently and in assembled condition.

6. In a device of the character described, a panel member comprising interconnected spaced walls, a plurality of switchboard terminal assemblies mounted upon one of said walls, a plurality of line terminal assemblies mounted upon the other of said walls, and circuits embodying protective apparatus electrically connected between said terminal assemblies, said assemblies including retaining bolts and being independently removable with such retaining bolts while said spaced walls remain interconnected.

7. In a device of the character described, a panel member comprising interconnected spaced walls, a plurality of switchboard terminal assemblies mounted upon one of said walls, a plurality of line terminal assemblies mounted upon the other of said walls, a plurality of assemblies embodying protective apparatus in circuit with said terminal assemblies and fixed along both sides of said panel member, said assemblies including retaining bolts removably engaging said panel member whereby the assemblies are completely and independently removable while said spaced walls remain interconnected.

8. Protective apparatus comprising a panel member having a pair of interconnected spaced walls, a plurality of switchboard terminal assemblies mounted at the edge of one of said walls, and a corresponding plurality of assemblies embodying protective apparatus mounted along the outer surfaces of said walls, said terminal assemblies each including electrical connecting means extending between said walls to said protective apparatus, said terminal assemblies each being individually removable while in assembled condition.

9. Protective apparatus comprising a panel member having a pair of interconnected spaced walls, a plurality of switchboard terminal assemblies mounted at the edge of one of said walls, and a corresponding plurality of assemblies embodying protective apparatus mounted along the outer surfaces of said walls, said terminal assemblies each including electrical connecting means extending between said walls to said protective apparatus, said assemblies including retaining bolts and said panel member being provided with slots for receiving said bolts whereby the assemblies are all independently removable while in assembled condition and while said spaced walls remain interconnected.

10. Protective apparatus comprising a panel member having a pair of interconnected spaced walls, a plurality of switchboard terminal assemblies mounted at the edge of one of said walls, a plurality of line terminal assemblies mounted at the edge of the other of said walls, and a corresponding plurality of assemblies embodying protective apparatus mounted along the outer surfaces of both of said walls, certain of said terminal assemblies including individual electrical connecting means extending between said walls to said protective apparatus, said assemblies including retaining bolts and said panel member being slotted for receiving said bolts whereby the assemblies are all independently removable while said spaced walls remain interconnected.

11. Protective apparatus comprising a panel member having a pair of interconnected spaced walls, a plurality of switchboard terminal assemblies mounted at the edge of one of said walls, a plurality of line terminal assemblies mounted at the edge of the other of said walls, and a corresponding plurality of assemblies embodying protective apparatus mounted along the outer surfaces of both of said walls, said assemblies each being provided with fuse clips, the clip on each terminal assembly cooperating to retain a fuse with a clip on a protective apparatus assembly, said assemblies including retaining bolts and said panel member being slotted for receiving said bolts whereby the assemblies are all independently removable while said spaced walls remain interconnected.

In witness whereof, I have hereunto subscribed my name.

ROY G. SANDS.